United States Patent [19]

Hanson

[11] Patent Number: 5,123,251
[45] Date of Patent: Jun. 23, 1992

[54] METHOD OF OPERATING A TRANSPORT REFRIGERATION UNIT

[75] Inventor: Jay L. Hanson, Bloomington, Minn.

[73] Assignee: Thermo King Corporation, Minneapolis, Minn.

[21] Appl. No.: 728,468

[22] Filed: Jul. 11, 1991

[51] Int. Cl.$^5$ .................. F25B 19/00; G08B 23/00
[52] U.S. Cl. .................................. 62/89; 62/231; 236/94; 340/870.02
[58] Field of Search ............. 236/94, 46 R; 165/11.1; 340/870.01, 870.02, 635, 679; 62/231, 89, 127

[56] References Cited

U.S. PATENT DOCUMENTS

| | | | |
|---|---|---|---|
| 4,574,871 | 3/1986 | Parkinson et al. | 62/231 X |
| 4,583,682 | 4/1986 | Hernandez | 165/11.1 X |
| 4,663,725 | 5/1987 | Truckenbrod et al. | 364/505 |
| 4,918,932 | 4/1990 | Gustafson et al. | 62/89 |

Primary Examiner—William E. Wayner
Attorney, Agent, or Firm—D. R. Lackey

[57] ABSTRACT

A method of logging the operating time of a plurality of predetermined timeable functions of a transport refrigeration unit which includes the step of providing a plurality of hourmeters, at least certain of which are programmable. One of the plurality of timetable functions is selected for each programmable hourmeter. Each hourmeter includes a first memory, with the operating time of the associated selected timeable function being stored in the first memory. The times stored in the first memories of the hourmeters are individually transferred to a second memory which is common to all of the hourmeters in response to a predetermined event. In a preferred embodiment, the second memory has a plurality of memory banks, one of which is an active storage location for all hourmeters, until the occurrence of a predetermined event, at which time another of the memory banks becomes the active storage location for all hourmeters.

11 Claims, 8 Drawing Sheets

METHOD OF OPERATING A TRANSPORT REFRIGERATION UNIT

TECHNICAL FIELD

The invention relates in general to transport refrigeration units, and more specifically to transport refrigeration units which have microprocessor based electrical control.

BACKGROUND ART

U.S. Pat. No. 4,663,725, which is assigned to the same assignee as the present application, discloses the use of microprocessor based transport refrigeration control for use with a refrigerated container, with the refrigerant compressor being driven by an electric motor. This patent is directed primarily to the use of a microprocessor to operate the various components of the refrigeration system according to predetermined algorithms, and to detect and record faults which occur during the operation thereof.

U.S. Pat. No. 4,918,932, which is assigned to the same assignee as the present application, discloses the use of a microprocessor to determine average error between an operator selected set point temperature and the temperature of a space to be conditioned, using the outputs of return air and discharge air sensors. The average error is then used in the determination of an error signal which modulates the capacity of the system.

While these patents ably utilize the capabilities of a microprocessor in controlling the operation of a transport refrigeration system, it would be desirable, and it is an object of the present invention, to expand the use of the microprocessor which controls the unit to provide additional services related to maintenance of the transport refrigeration system.

SUMMARY OF THE INVENTION

The invention is a method of logging operating time for predetermined functions of a transport refrigeration unit, which includes the step of providing a plurality of hourmeters, with at least certain of the plurality of hourmeters being programmable. The remaining hourmeters may be dedicated hourmeters, which always log time relative to the same predetermined functions, such as the total unit operating time, the total time a refrigerant compressor of the unit is driven by an internal combustion engine, the total time the refrigerant compressor is driven by an electric motor, and the like. A menu of additional timeable functions related to the operation of the transport refrigeration unit is also provided.

Each of the programmable hourmeters is accessed by the user during an initialization procedure, and one of the plurality of timeable functions of the menu is selected for each accessed programmable hourmeter. Thereafter, the operating time of each selected timeable function, as well as the operating time of each function associated with a dedicated hourmeter, is stored in a first memory associated with each hourmeter. The time stored in the first memory, which is a volatile memory, is transferred to a non-volatile second memory in response to a predetermined event. The predetermined event which initiates the step of transferring the time stored in the first memory to a second memory is preferably the stored operating time of an hourmeter reaching a predetermined value. The transferring step only transfers the time associated with the hourmeter which reached the predetermined value.

In a preferred embodiment of the invention, at least one of the timeable functions includes an additional step, when selected, which enables the entering of a desired maintenance time interval. When the desired maintenance time interval is reached, a maintenance alarm is generated.

In another embodiment, the method includes the steps of pre-storing a code, with the user being required to enter a matching code when access to the programmable hourmeter is desired. The programmable hourmeters may only be accessed to select a timeable function when the entered code matches the stored code, and an active maintenance alarm may only be cleared when the entered code matches the stored code.

The second memory preferably includes a plurality of memory banks which are accessed in a predetermined sequence, with only the currently accessed memory bank being an active storage location. Time from all of the hourmeters is stored in the active memory bank, with the storage location advancing from an active memory bank to the next memory bank in the predetermined sequence upon the occurrence of a predetermined event. The predetermined event which initiates the step of advancing from an active memory bank to the next memory bank in the predetermined sequence is preferably the stored operating time of the transport refrigeration unit in the active memory bank reaching a predetermined value. In other words, when the dedicated hourmeter which accumulates total unit operating time reaches a predetermined value in one memory bank, such as 10,000 hours, then the time accumulated relative to all of the hourmeters is stored in the next memory bank of the sequence.

In order to correct faults or anomalies related to the storage of time in the second memory, the invention preferably includes the step of storing an indication of the currently active memory bank, and the step of checking the memory banks in the predetermined sequence until finding the active memory bank when the stored indication is faulty.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
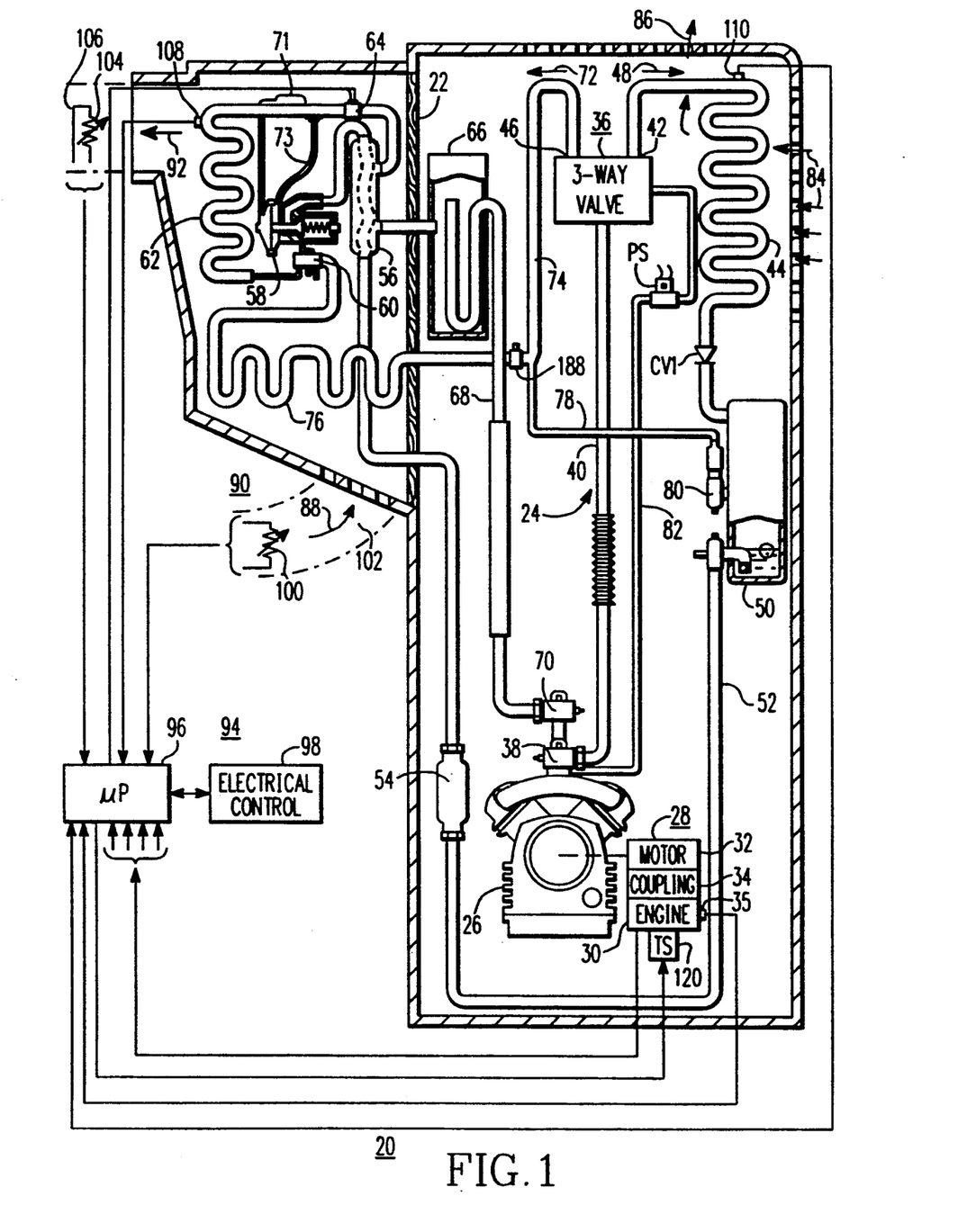
FIG. 1 is a partially block and partially schematic diagram of a transport refrigeration system having a refrigerant compressor driven by a prime mover arrangement which may include an internal combustion engine and an electric motor, which may utilize the methods of the invention.

Referring now to the drawing, and to FIG. 1 in particular, there is shown a transport refrigeration unit 20 which may utilize the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects one of the two prime movers and provides an output signal to identify the selection.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described.

When three-way valve 36 selects the cooling cycle output port 42, it connects compressor 26 in a first refrigerant circuit 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and an equalizer line 73.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may optionally be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low side of compressor 26 via a normally closed pilot solenoid valve PS. When solenoid valve PS is deenergized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served space 90 whose air is to be conditioned, through the evaporator coil 62, and the resulting cooled or heated air 92, called "discharge air", is returned to the space 90. During an evaporator defrost cycle, the evaporator fan or blower is not operated, and a defrost air damper be operated to close the discharge air path to the conditioned space 90.

Transport refrigeration unit 20 is controlled by microprocessor based electrical control 94 which includes a microprocessor 96 and electrical control 98. Electrical control 98 includes relays, and the like, as will be explained relative to FIGS. 2A and 2B. The microprocessor 96 receives input signals from appropriate sensors, such as from a return air temperature sensor 100 disposed in a suitable return air path 102, a discharge air temperature sensor 104 disposed in a suitable discharge air path 106, from a coil temperature sensor 108 disposed to sense the temperature of the evaporator coil 62, from a refrigerant pressure sensor (HPCO) 110 disposed on the high side of the refrigerant circuit 48, and from various engine sensors shown in FIG. 2B, such as oil level sensor 112 , oil pressure sensor 114, engine coolant level sensor 115, engine coolant temperature sensor 116, and engine speed sensor 118.

Microprocessor 96, among other things, controls modulation valve 64, hot gas solenoid valve 77, and a throttle or high speed solenoid 120. Other functions controlled by microprocessor 96 are shown in FIGS. 2A and 2B, and will be hereinafter described.

Figure 2A:
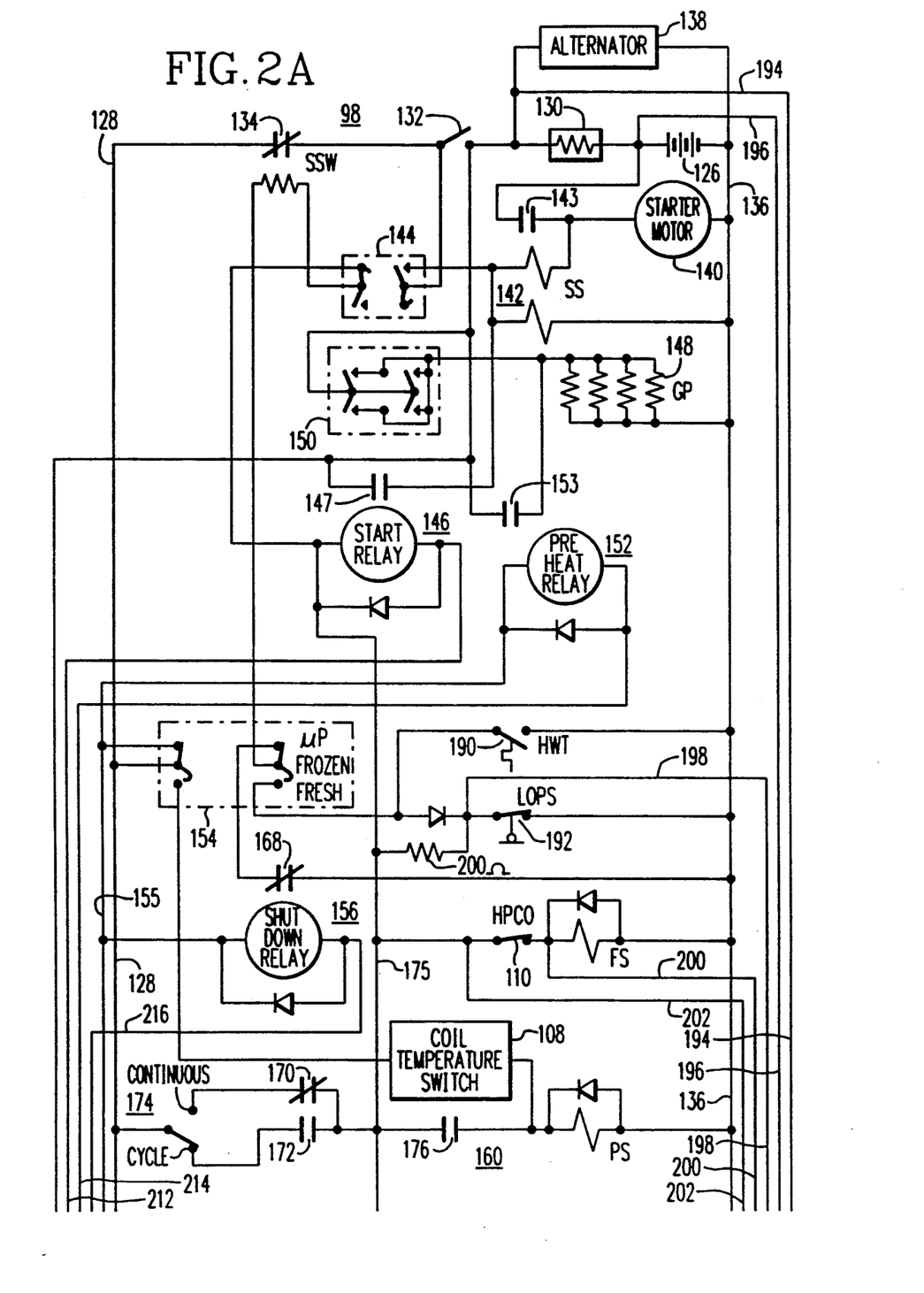
FIGS. 2A and 2B may be assembled to provide an electrical schematic diagram of microprocessor based electrical control shown in block form in FIG. 1.
Figure 2B:
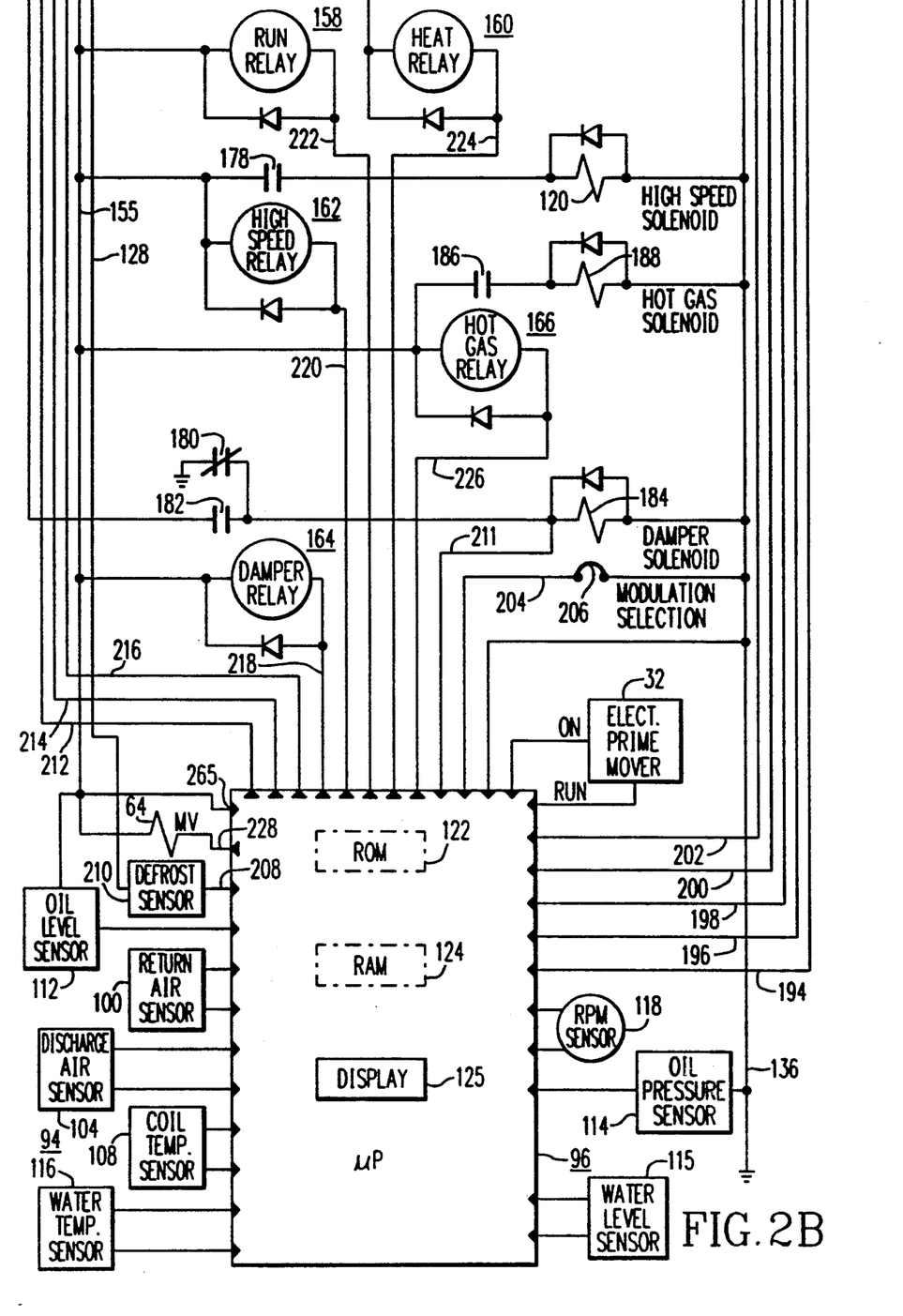
Figure 3:
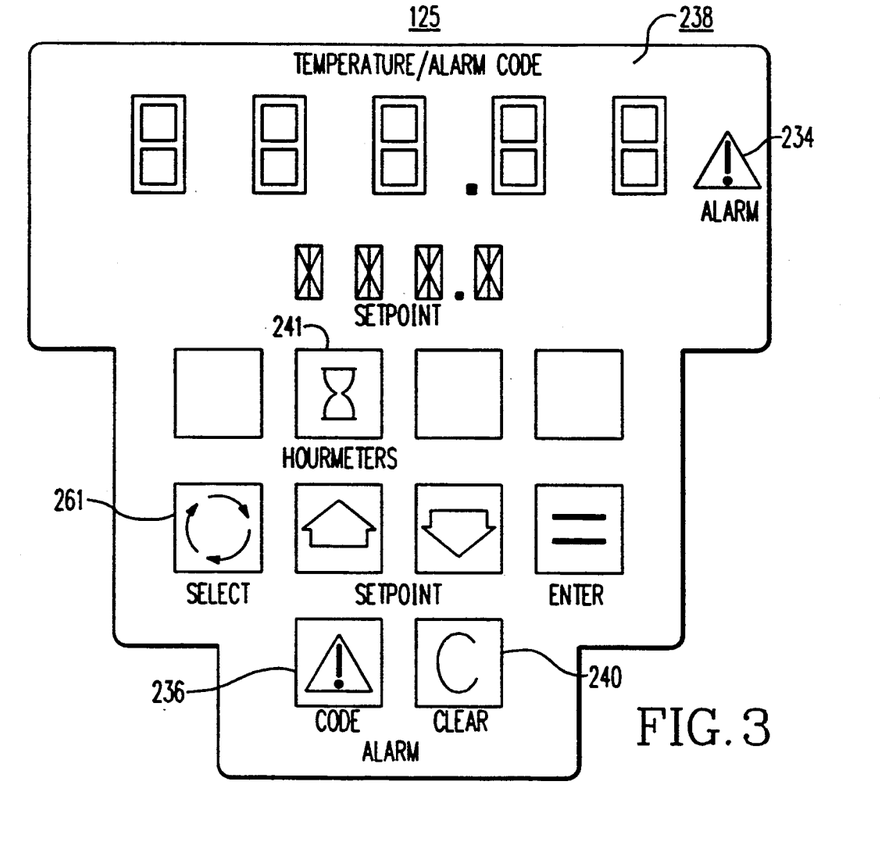
FIG. 3 sets forth an exemplary display which may be used for the display shown in block form in FIG. 2A.

FIGS. 2A and 2B may be assembled to provide a detailed schematic diagram of microprocessor based electrical control 94, which includes microprocessor 96 and control 98. As is well known, microprocessor 96 includes a read-only memory (ROM) 122 for storing programs to be hereinafter described, and a random access memory (RAM) 124 for software timers, flags, input signals, output signals, and other values generated by the operating programs. Microprocessor 96 also includes a display 125 for displaying fault codes, system status indicating lights, and the like. FIG. 3 sets forth an exemplary arrangement for display 125.

Electrical control 98 includes a battery 126 which has one side connected to a first conductor 128 via a DC shunt 130, an on-off switch 132, and normally closed contacts 134 of a protective reset switch SSW. The remaining side of battery 126 is connected to conductor 136, which is grounded. Control 98 further includes an alternator 138 driven by prime mover 28; a starter motor 140, for cranking engine 30,. which is controlled by a starter solenoid 142 having associated normally open contacts 143, an ignition switch 144, and a start relay 146 having associated normally open contacts 147; and glow plug resistors (GP) 148, for pre-heating engine 30, which are controlled by a pre-heat switch 150 and by a pre-heat relay 152 which has normally open contacts 153.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of the microprocessor 96. The upper position provides voltage from conductor 128 to a conductor 155. An intermediate position of switch 154, in which the center terminal is not connected to either the upper terminal or the lower terminal, is selected when the microprocessor 96 is not utilized and the load in the conditioned space 90 is frozen. This switch position will cause unit 20 to operate continuously in a low speed cool mode. The lower position of switch 154 is selected when the microprocessor 96 is not utilized and the load in the conditioned space is fresh. This position of switch 154 will cause unit 10 to operate continuously, cycling between heating and cooling cycles under the control of the hereinbefore mentioned coil temperature switch 108. Coil temperature switch 108 is preset to close at a predetermined coil temperature, such as 35 degrees F., to energize the pilot solenoid PS and initiate a heating cycle, and to open at a predetermined higher temperature, such as 38 degrees F., to de energize pilot solenoid PS and initiate a cooling cycle.

In addition to the relays already mentioned, control 98 includes a shutdown relay 156, a run relay 158, a heat relay 160, a high speed relay 162, a defrost damper relay 164, and a hot gas relay 166. Shutdown relay 156 is normally energized, and is de-energized to shut unit 10 down via its associated set of normally-closed contacts 168 which ground the protective switch SSW and cause it to open its contacts 134. The run relay 158 has normally-closed and normally open contacts 170 and 172, respectively, connected to a mode selector switch 174 which has an input connected to conductor 128. Selector switch 174 selects either a continuous operating mode in which the prime mover 28 operates continuously, or a cycling start-stop mode, also called "cycle sentry", which includes starting and stopping the prime mover 28.

The normally-closed contacts 170 of run relay 158 are connected to the "continuous" position of selector switch 174, and the normally-open contacts 172 of run relay 158 are connected to the "cycling" position of selector switch 174. Contacts 170 or contacts 172 provide voltage to a conductor 175 from conductor 128 and selector switch 174.

Heat relay 160 has a set of normally open contacts 176 for controlling the pilot solenoid PS. High speed relay 162 has a set of normally open contacts 178 for controlling the high speed solenoid 120. Damper relay has a set of normally closed contacts 180 and a set of normally open contacts 182, connected to control a defrost damper solenoid 184. Hot gas relay 166 is provided for controlling the hot gas solenoid valve 77 via a set of normally open contacts 186, When a hot gas solenoid 77 is provided in hot gas line 74.

Control 98 also includes a engine coolant temperature switch (high water temperature -HWT) 190, which closes when the engine coolant reaches a predetermined elevated temperature, and a low oil pressure switch (LOPS) 192 which is open as long as engine pressure is normal. The closing of either switch 190 or 192 will shut unit 20 down via the manual reset switch SSW.

Microprocessor 96 senses the voltage across DC shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, ie., negative, indicates the battery is discharging.

Microprocessor 96 also has a conductor 198 which senses the position of the low oil pressure switch 192, conductors 200 and 202 which sense the voltage level on first and second sides, respectively, of the high refrigerant cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, and a conductor 211 which detects voltage on the damper solenoid 184.

Microprocessor 96 has a plurality of output conductors for controlling various functions, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in the modulation valve 64.

As the microprocessor functions are described, only those necessary to understanding the invention will be described in detail. Certain of the functions shown in block form, may be described in detail and claimed in concurrently filed application Ser. Nos. 728,464, 728,665, 728,471, and 728,463.

Figure 4:
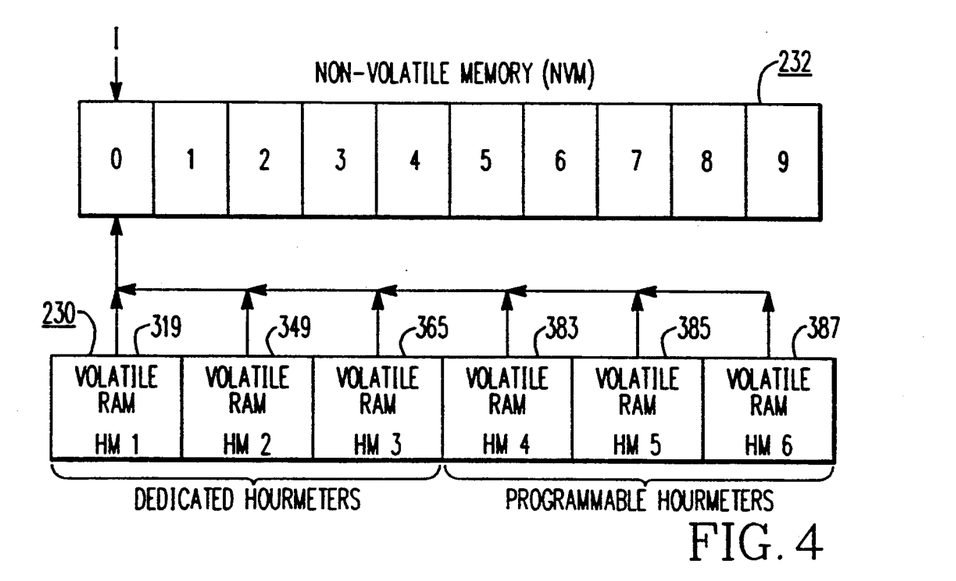
FIG. 4 is a block diagram which sets forth an hourmeter arrangement according to the teachings of the invention which includes dedicated and programmable hourmeters, which include volatile and non-volatile memories.

Referring now to FIG. 4, there is shown a block diagram of an hourmeter arrangement which may be operated according to the methods of the invention. Any desired number of hourmeters may be utilized, with six being used for purposes of example. Certain of the hourmeters are fixed or dedicated to time predetermined functions, while others are programmable. For purposes of example, three hourmeters HM1, HM2 and HM3 are dedicated, and three hourmeters HM4, HM5 and HM6 are programmable. Each hourmeter includes a volatile random access memory (RAM), shown generally at 230, which may a location in RAM 124. Also associated with the hourmeters is a nonvolatile memory (NVM), such as an electrically erasable memory, shown generally at 232. NVM 232 includes a plurality of memory banks, such as 10, numbered 0 through 9.

The memory banks of NVM 232 are accessed or utilized in sequence, starting with bank 0 as the first active bank. As each volatile RAM of an hourmeter reaches a predetermined time value, such as one hour, the hour is stored and counted in memory bank 0 of NVM 232. Nonvolatile memory NVM 232 maintains individual or separate counts for each of the six hourmeters. When hourmeter HM1, associated with total "on" time of transport refrigeration unit 20, reaches a predetermined count, such as 10,000 hours, the "hour" counts for all six hourmeters are then stored in memory bank 1. An indexer "I", shown in FIG. 4, indicates the active memory bank, and when hourmeter HM1 reaches 10,000 hours in memory bank 0, the indexer "I" is moved to memory bank 1.

It is unlikely that any specific refrigeration unit will fill all 10 memory banks, as that would be the equivalent of 11.4 years of continuous operation. However, should all memory banks become filled, an alarm will be generated which will illuminate alarm icon 234 in display 125, as illustrated in FIG. 3. The operator can determine the cause of the alarm by pressing alarm code button 236, which displays an alarm code in the uppermost portion 238 of display 125.

Most alarms, such as those related to a problem with refrigeration unit 20, may be cleared by the user while the alarm code is displayed at 238, by pressing clear button 240. Certain alarms, however, such as those related to pre-set maintenance intervals, can only be cleared through a "guarded access" program, as will be hereinafter explained.

Figure 5:
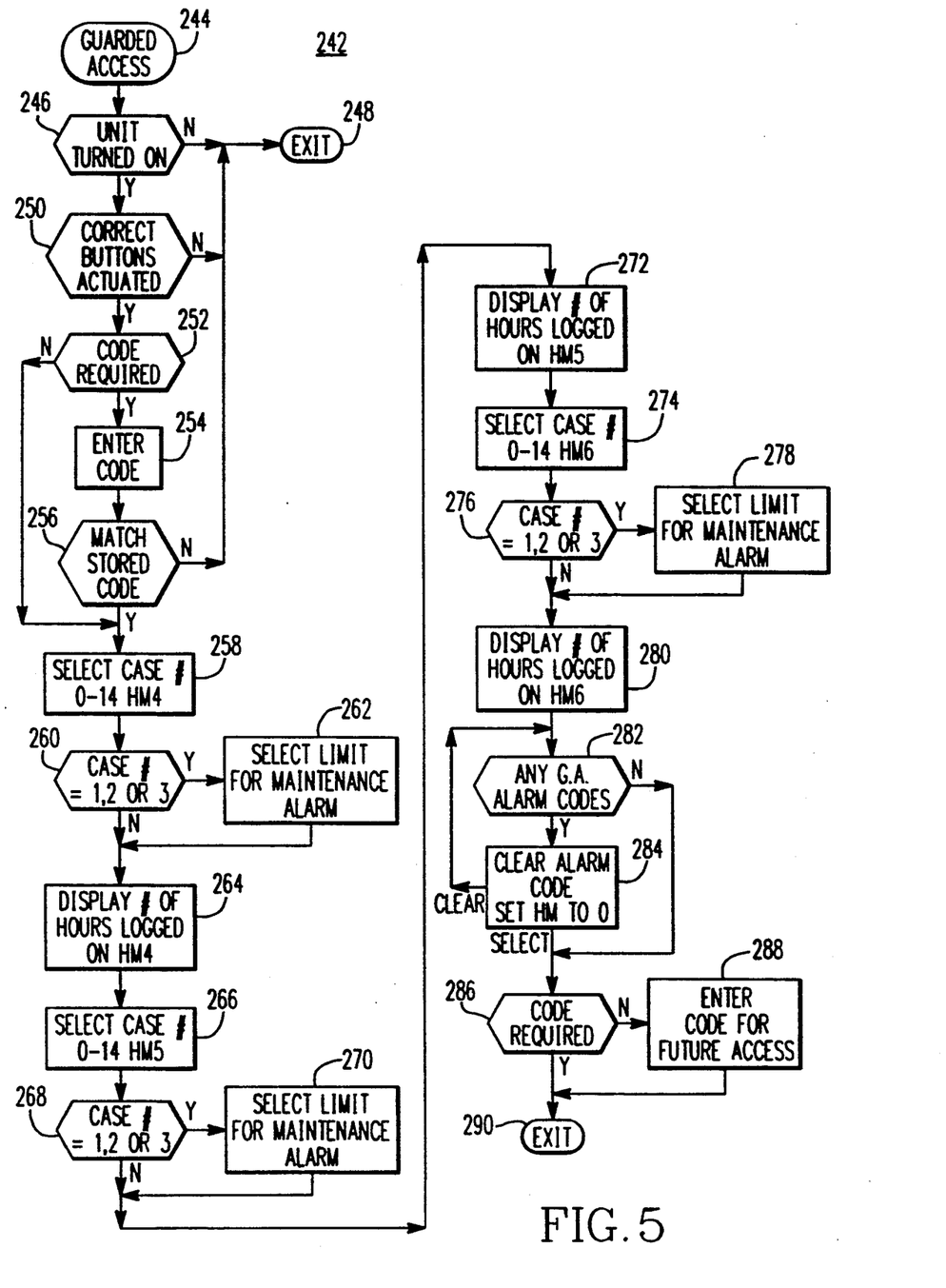
FIG. 5 is a flow diagram of a program which provides a guarded access or entry to the programmable hourmeters shown in FIG. 4.

FIG. 5 is a flow diagram of a program 242 for implementing the hereinbefore mentioned "guarded access" function. In general, the guarded access function enables authorized personnel to: (1) read the total time accumulated on each of the programmable hourmeters, (2) to reset the time on a programmable hourmeter, (3) to select a different function of transport refrigeration unit 20 for a programmable hourmeter to monitor and log operational time therefor, (4) set a maintenance time interval for certain of the monitorable functions, which will trigger a maintenance alarm when the operating time limit is reached, (5) clear an active maintenance related alarm, and (6) to initially input a code which must be matched to gain access to the program functions, as well as for periodically changing the code for security purposes. The time logged on each of the hourmeters may be determined without going through guarded access, by pressing hourmeter button 241 on display 125.

Guarded access program 242 is entered at 244 and step 246 determines if transport refrigeration unit 20 is turned on, ie., is switch 132 shown in FIG. 2A closed? If not, program 242 exits at 248. If unit 20 is turned on, step 250 determines if an initial program entry code is correct. This initial code may, for example, be a predetermined combination of two or three of the buttons on display 125 being actuated simultaneously. If the initial code is not correct, the program exits at 248. If the initial code is correct, step 252 determines if an additional security code is required to gain program access. When program 242 is initialized by authorized personnel, step 252 will find that the additional security code is not required. After program 242 has been initialized and provided with the additional security code, step 252 will find that the additional code is required, and step 254 will direct the user to enter the security code, which may be a sequential or simultaneous actuation of predetermined display buttons, as desired. If step 256 finds that the code entered does not match the stored code, the program exits at 248.

When the additional code matches the stored code, and also when step 252 finds that the additional code is not necessary, step 258 directs the user to input a "case number" which selects a function of transport refrigeration unit 20 for hourmeter HM4 to monitor, by logging the operational time of the selected function. The following TABLE sets forth an exemplary set of active functions of transport refrigeration unit 20 which may be monitored.

TABLE

| CASE # | FUNCTION | WHAT UP 96 CHECKS |
|---|---|---|
| 0 | Off | — |
| 1 | Total Run Time | FS & Electric Run |
| 2 | Engine Run Time | FS |
| 3 | Electric Run Time | Electric Run = True |
| 4 | Modulation | Modulation Flag = True |
| 5 | Defrost | Mode Flag (MF) = 3 or 4 |
| 6 | Heat | Condition Flag (CF) = Heat |
| 7 | Cool | CF = Cool |
| 8 | High Speed | CF = High Speed |
| 9 | Low Speed | CF = Low Speed |
| 10 | Null Engine | CF = NULLDC or NULLDH |
| 11 | Null Electric | CF = NULLEC or NULLEH |
| 12 | In-Range | In-range Flag = True |
| 13 | Not In-Range | In-range Flag = False |
| 14 | Cycle Mode | MF = Cycle Sentry |

At this point, display 125 will show a 0 in portion 238, and the user steps through the numbers until reaching the desired number, using a select button 261 on display 125.

Certain of the 14 functions may have maintenance interval alarm capability associated therewith, which, for purposes of example, will be assumed to be cases 1, 2 and 3. Thus, step 260 determines if one of the case numbers 1, 2 or 3 was selected for hourmeter HM4 to monitor in step 258. If one of the case numbers 1, 2 or 3 was selected, step 262 directs the user to input a limit value which will trigger a guarded access alarm when the operational time of the function logged by hourmeter HM4 reaches the time interval which is input during step 262. Step 262 and the "no" branch of step 260 then advance to step 264 which reads out the number of hours logged on hourmeter HM4.

Steps 266, 268, 270 and 272 perform the same functions for hourmeter HM5 as the hereinbefore described steps 258, 260, 262 and 264 provided for hourmeter HM4. In like manner, steps 274, 276, 278 and 280 perform the same functions for hourmeter HM6, as the hereinbefore described steps 258, 260, 262 and 264 provided for hourmeter HM4.

Step 282 then determines if there ar any active guarded access alarms, e.g., have any of the alarms associated with case numbers 1, 2 or 3 reached the limit set in steps 262, 270 or 278? If so, step 284 enables the user to clear an active alarm by using the "clear" button 240 on display 125. The "select" button and the "no" branch from step 282 advances the program to step 286 which determines if the additional security code, previously checked in step 252, has been entered. If it has not been entered, or if the user desires to change the code, step 288 enables the user to input a code for step 256 to check the next time guarded access program 242 is entered. Step 288 and the "yes" branch of step 286 exit the program at 290.

Figure 6:
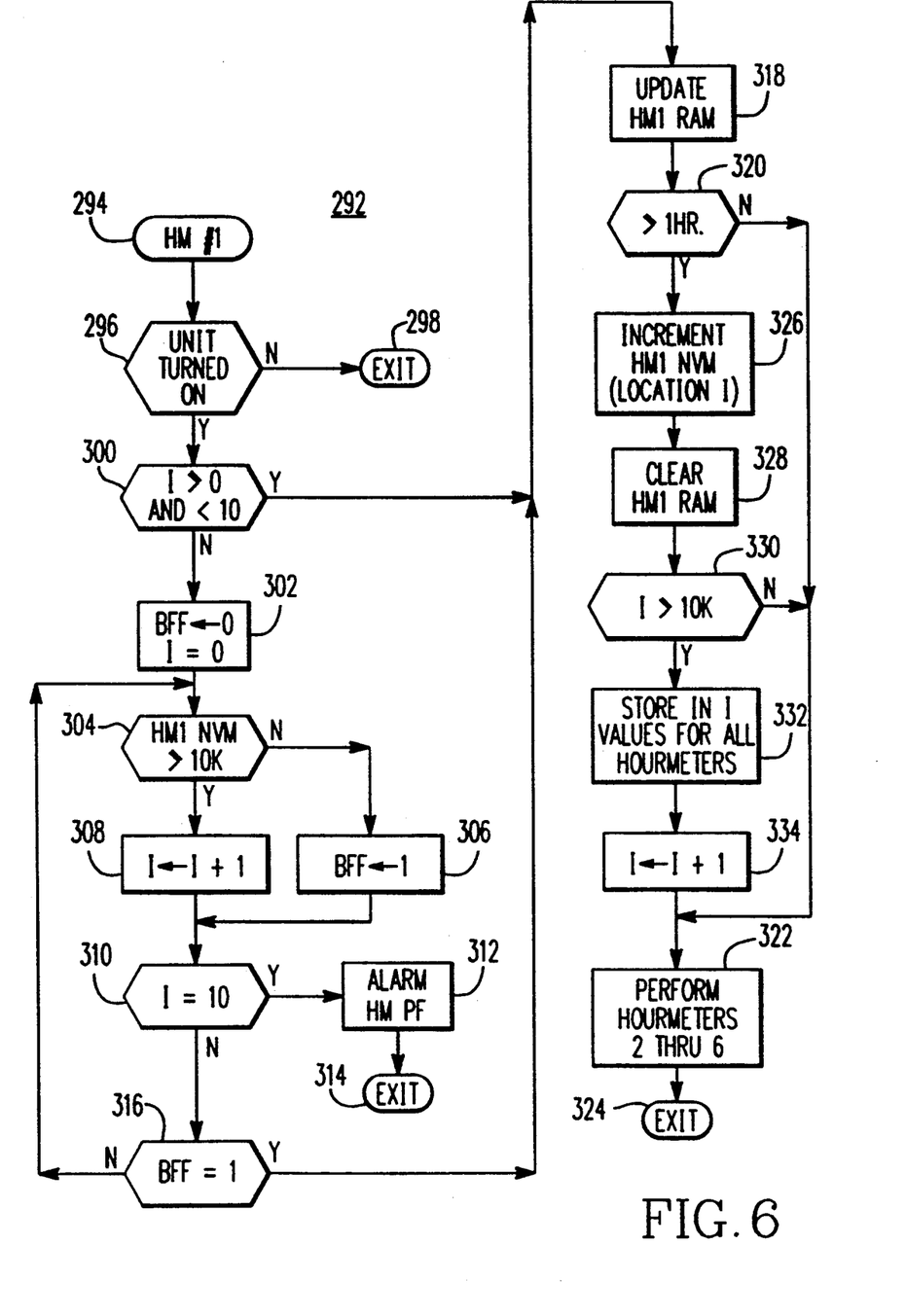
FIG. 6 is a flow diagram of a program related to a dedicated hourmeter which logs total operating time of the transport refrigeration unit.

FIG. 6 is a flow chart for a program 292 which implements the functions of the first dedicated hourmeter HMI, which logs total "on" time of transport refrigeration unit 20. Program 292 also performs some general functions such as correcting the position of the memory bank indexer "I" shown in FIG. 4, when it is out of step. Program 292 is entered at 294 and step 296 determines if transport refrigeration unit 20 is turned on, ie., is switch 132 shown in FIG. 2A closed. If not, the program exits at 298. If unit 20 is "on", step 300 checks the memory bank indexer I to determine if it is set at a plausible number, ie., 0 through 9. If it is not set at a plausible number, step 302 initiates a portion of program 292 dedicated to correcting the out-of-step condition.

Step 302 sets a "bank found flag" BFF false, ie., to 0, and it also sets indexer "I" to the first memory bank 0. Step 304 then checks memory bank location 0 of NVM 232 to determine if the time logged for hourmeter HMI has reached the bank limit of 10,000 hours. If hourmeter HM1 has not logged the 10,000 hour limit in the memory bank presently being considered, ie., bank 0, then bank 0 is the correct bank and step 306 sets the bank found flag BFF true. If step 304 finds that hourmeter HM1 has reached the 10,000 hour limit for memory bank 0, then step 304 goes to step 308 which increments the memory bank indexer "I" to the next memory bank location, eg., memory bank 1 in the present example.

Step 310 checks to see if the indexer "I" has been indexed to 10, which indicates that all of the memory banks 0 through 9 have been filled. As hereinbefore stated, this is highly unlikely, but all possibilities have to be taken into account. Should step 310 find that unit 20 has logged 100,000 hours of "on" time, step 312 sets an alarm HMPF which illuminates alarm icon 234 on display 125. Upon actuating alarm code button 236 on display 125, the operator will find a code displayed which indicates that hourmeter HM1 has exceeded its 100,000 hour limit. While alarm HMPF can be reset by the user without going through guarded access, it will continue to appear each time program 292 is run, to remind maintenance personnel to re-initiate NVM 232.

If step 310 finds that indexer "I" is not 10, step 316 determines if the bank found flag BFF is true. If it was set true in step 306, the program advances to step 318, to enter the portion of program 292 where the "yes" branch of step 300 goes when the indexer "I" is found to be in a plausible range. If step 316 finds that BFF is not true, then step 316 returns to check the contents of memory bank which the indexer "I" was advanced to in step 308. The program continues to loop back to step 304 until the proper memory bank of NVM 232 is found, at which time step 316 goes to step 318. Step 318 updates the time stored in volatile RAM 319 in FIG. 4. Step 320 determines if the time stored in RAM 319 has reached 1 hour. If RAM 319 has not reached 1 hour, the program goes to step 322 which updates the remaining hourmeters, as will be hereinafter explained, and the program exits at 324. If RAM 319 has reached 1 hour, then step 326 increments a location in the active memory bank of NVM 232 which logs and maintains a count of the hours of HM1. Step 328 then clears RAM 319 and the program goes to step 330.

Step 330 determines if the time stored for hourmeter HM1 in the currently active bank, ie., the bank indicated by indexer "I", has reached the limit, eg., 10,000 hours. If not, the program goes to the hereinbefore described step 322, and the program exits at 324. When step 330 finds that the time logged in the active memory bank has reached the bank limit for hourmeter HM1, then step 332 stores the values for all hourmeters in the next memory bank of the sequence, and step 334 takes care of moving the indexer "I" to the next memory bank. Thus, the currently active memory bank will have the total time logged by each of the six hourmeters. While the total time logged for HM1 will be over 10K in memory banks 1 through 9, step 330 only looks at the hours stored in a memory bank after it became the newly active bank. Step 322 then performs the programs for the remaining hourmeters, shown in FIGS. 7, 8 and 9.

Figures 7, 8:
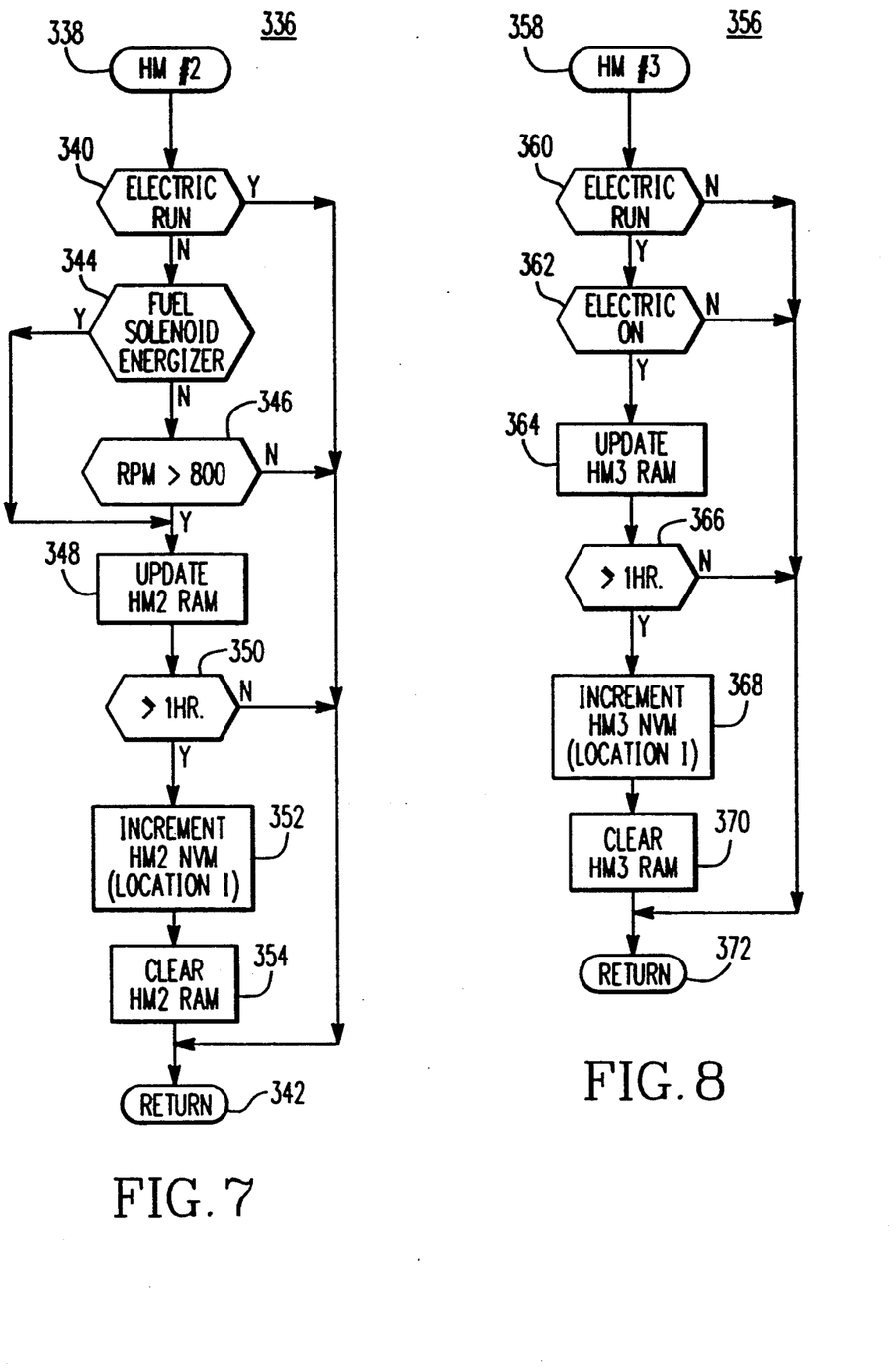
FIG. 7 is a flow diagram of a program related to another dedicated hourmeter which logs the operating time of an internal combustion engine used as a prime mover for a refrigerant compressor of the transport refrigeration unit.
FIG. 8 is a flow diagram of a program related to another dedicated hourmeter which logs the operating time of an electric motor used as an alternative prime mover for the refrigerant compressor of the transport refrigeration unit.

FIG. 7 sets forth a flow diagram of a program 336 for implementing the functions of dedicated hourmeter HM2, which logs the actual running time of engine 30. Step 340 checks to see if the electric prime mover, ie., electric motor 32, is running. If so, an "electric run" input shown in FIG. 2A will be high. If motor 32 is running, then program 336 exits at 342. If the "electric run" input is low, then step 344 determines if the engine fuel solenoid FS is energized, by checking input conductor 200. If conductor 200 is not high, microprocessor 96 performs one more check to determine if engine 30 is running, via step 346 which checks the input from RPM sensor 118 to determine if the engine RPM exceeds a predetermined value, such as 800 RPM. The "yes" branches from steps 344 and 346 proceed to step 348, which updates RAM 349 shown in FIG. 4, as engine 30 is running. The "no" branch of step 346 proceeds to program exit 342.

After step 348 updates RAM 349, step 350 determines if RAM 349 has reached 1 hour. If not, the program exits at 342. When step 350 finds RAM 349 has reached 1 hour, step 352 increments the location of the currently active memory bank which logs time for hourmeter HM2, ie., the location indicated by indexer or pointer "I". Step 354 clears RAM 349, and the program exits at 342.

FIG. 8 sets forth a program 356 for implementing the functions of the dedicated hourmeter HM3, which logs the total running time of the electric motor 32. Program 356 is entered at 358 and step 360 checks an input "electric run" shown in FIG. 2B to determine if motor 32 has been selected as the prime mover. If input "electric run" is low, the program exits at 372. If the "electric run" input is high, then step 362 checks an "electric on" input shown in FIG. 2B to determine if motor 32 is energized. If motor 32 is not energized, the program exits at 373. If motor 32 is energized, step 364 updates RAM 365 shown in FIG. 4, and step 366 determines if RAM 365 has reached 1 hour. When RAM 365 reaches 1 hour, step 368 increments the location in the currently active memory bank of memory NVM 232 which logs the hours of hourmeter HM3. Step 370 then clears RAM 365, and the program exits at 372.

Figure 9:
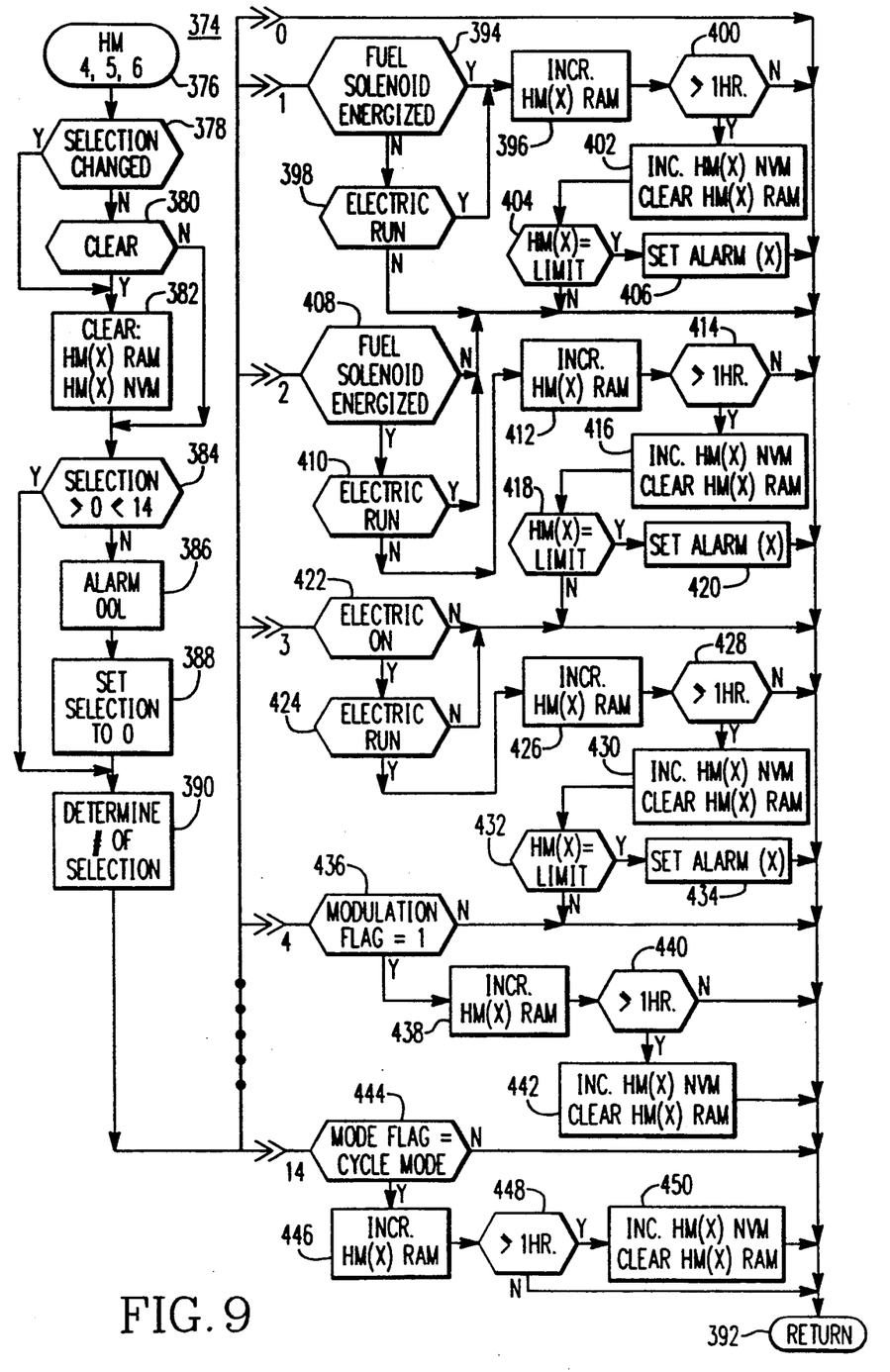
FIG. 9 is a flow diagram of a program used for each of the programmable hourmeters of the arrangement set forth in FIG. 4.

FIG. 9 sets forth a program 374 which implements the functions of the programmable hourmeters HM4, HM5, and HM6. Program 374 is the same for each of the programmable hourmeters, and thus it will be described for only programmable hourmeter HM4. Program 374 is entered at 376 and step 378 determines if step 258 of program 242 shown in FIG. 5 changed the selection of the case number. If the selection has not been changed, step 380 determines if the "clear" button was actuated during the guarded access selection of the case number. If the selection has changed, or the clear function was actuated, step 382 clears both RAM 383 associated with hourmeter HM4, and the location of NVM 232 which logs time for hourmeter HM4. When program 374 is running hourmeter HM5, step 382 would clear RAM 385 and the proper location in NVM 232, and when program 374 is running hourmeter HM6, step 382 would clear RAM 387 and the proper location in NVM 232.

The "no" branch from step 380, which is followed when the appropriate RAM and NVM 232 are not cleared, and step 382, proceed to step 384 to determine if the case number selected is plausible. If the case number selected is not one of the numbers 0 through 14, then step 386 sets an "out of limit" alarm OOL, which illuminates alarm icon 234 on display 125. Step 388 sets the case selection number to "0", which means that the programmable hourmeter being presently run will not record time for any function. Step 390 determines the number of the case selection. If number 0 was selected, or step 388 set the selection to 0, the program exits at 392.

If step 390 finds that the case number selected was #1, the total running time of unit 20, ie., an accumulation of the engine running time plus the motor running time, the program goes to step 394 which checks to see if the engine is running, such as by checking input line 200 to determine if the fuel solenoid FS is energized. If fuel solenoid FS is energized, step 396 increments RAM 383. If step 394 finds that the fuel solenoid FS is not energized, step 398 checks the "electric run" input. If the "electric run" input is high, indicating motor 32 is running, step 398 goes to step 396 to increment RAM 383. If step 398 finds that motor 32 is not running, the program exits at 392.

Step 396 goes to step 400 which determines if RAM 383 has reached 1 hour. If not, the program exits at 392. When step 400 finds that RAM 383 has reached 1 hour, step 402 increments the location of the active memory bank of NVM 232 which logs hours of hourmeter HM4, and it also clears RAM 383. Step 404 checks to see if the time logged in NVM 232 for hourmeter HM4 has reached the limit set in step 262 of FIG. 5. If the limit has not been reached, the program exits at 392. When step 404 finds the limit has been reached, step 406 sets an alarm HM4LM, which illuminates alarm icon 234, and the program exits at 392. Alarm HM4LM is a guarded access alarm, which can only be reset in the guarded access program 242 shown in FIG. 5.

When step 390 finds that the case number selected is #2, which logs total running time of engine 30, step 390 goes to step 408 which determines if fuel solenoid FS is energized. If fuel solenoid FS is not energized, the program exits at 392. When step 408 finds the fuel solenoid energized, step 410 checks to see if the "electric run" input is high. If it is, the program exits at 392. When steps 408 and 410 find the fuel solenoid energized and electric run false, then step 410 goes to steps 412, 414, 416, 418 and 420, which are respectively similar to the hereinbefore described steps 396, 400, 402, 404 and 406.

When step 390 finds that the case number selected is #3, which logs total running time of electric motor 32, step 390 goes to step 422 which checks the "electric on" input, and if it is high, step 424 checks the "electric run" input. If the "electric run" and "electric on" inputs are not both high, the program exits at 392. When these inputs are both high, then step 424 goes to steps 426, 428, 430, 432, and 434, which are respectively similar to the hereinbefore described steps 396, 400, 402, 404 and 406.

When step 390 finds that the case number selected is #4, which logs the time that transport refrigeration unit 20 is in modulation, ie., modulation valve 64 is operational, step 390 goes to step 436 which determines if the modulation valve flag MVF is true. If flag MVF is false, program 374 exits at 392. If flag MVF is true, step 438 increments RAM 383, and step 440 determines if RAM 383 has reached 1 hour. When RAM 383 reaches 1 hour, step 442 increments the location of the active memory bank of NVM 232 which logs time for programmable hourmeter HM4. Step 442 also clears RAM 383, and program 374 exits at 392. When step 440 finds that RAM 383 has not reached 1 hour, the program exits at 392.

When step 390 finds that the case number selected is #14, which logs the time that transport refrigeration unit is in the cycle mode, program 374 goes to step 444 which checks the mode flag MF to see if it is set to the cycle sentry mode. If mode flag MF is not set to "cycle sentry", the program exits at 392. When step 444 finds mode flag MF is set to "cycle sentry", steps 446, 448 and 450 perform the same functions just described relative to steps 438, 440 and 442.

Program 374 for implementing case numbers 5 through 13 would be similar to that just described for case numbers 4 and 14. The only difference being that the steps in case numbers 5 through 13 which correspond to steps 436 and 444 of case numbers 4 and 14 would check the item indicated in the TABLE to determine if time should be logged.

I claim:

1. A method of logging operating time for predetermined functions of a transport refrigeration unit, comprising the steps of:
   providing a plurality of hourmeters, with at least certain of said plurality of hourmeters being programmable,
   providing a plurality of timeable functions related to the transport refrigeration unit,
   accessing each of said programmable hourmeters,
   selecting one of said plurality of timeable functions for each accessed programmable hourmeter,
   storing operating time in first memory means associated with said plurality of hourmeters, with the operating time for the programmable hourmeters being related to the operating times of the functions selected in the selecting step,
   and transferring the time stored in the first memory means to a second memory means in response to a predetermined event.

2. The method of claim 1 including the steps of:
   storing a code,
   entering a code prior to the step of accessing the programmable hourmeters, and
   enabling the accessing step only when the entered code matches the stored code.

3. The method of claim 1 wherein at least one of the timeable functions includes an additional step, when selected, of entering a desired maintenance time interval, and including the step of providing a maintenance alarm when the operating time of said at least one timeable function reaches the associated entered maintenance time interval.

4. The method of claim 3 including the steps of:
   storing a code,
   entering a code prior to the step of accessing the programmable hourmeters,
   and clearing the maintenance alarm,
   with said step of clearing the maintenance alarm being enabled only when the entered code matches the stored code.

5. The method of claim 1 wherein the predetermined event which initiates the step of transferring the time stored in the first memory means to a second memory means is the stored operating time of an hourmeter reaching a predetermined value, with the transferring step only transferring the time associated with the hourmeter which reached said predetermined value.

6. The method of claim wherein the first memory means associated with the storing step is a volatile memory, and the second memory means associated with the transferring step is a non-volatile memory.

7. The method of claim 1 wherein the second memory means includes a plurality of memory banks, and including the steps of accessing the plurality of memory banks in a predetermined sequence, with only the currently accessed memory bank being an active storage location, storing the time from all of the hourmeters in the active memory bank, and advancing from an active memory bank to the next memory bank in the predetermined sequence upon the occurrence of a predetermined event.

8. The method of claim 7 wherein a predetermined one of the plurality of hourmeters logs operating time of the transport refrigeration unit, with the predetermined event which initiates the step of advancing from an active memory bank to the next memory bank in the predetermined sequence being the stored operating time of the transport refrigeration unit in the active memory bank reaching a predetermined value.

9. The method of claim 8 including the step of providing an alarm when the stored operating time of the transport refrigeration unit in all of the plurality of memory banks has reached the predetermined value.

10. The method of claim 7 including the step of storing an indication of the currently active memory bank, and including the step of checking the memory banks in the predetermined sequence until finding the active memory bank when the stored indication is faulty.

11. The method of claim 1 wherein each of the plurality of timeable functions is uniquely identified to provide a plausible group of identifications, and wherein the step of storing the operating time of a programmable hourmeter includes the steps of:

determining if the identification of the selection of a timeable function associated with the programmable hourmeter is plausible, and terminating the storing step without logging time when the determining step finds the identification not plausible.

* * * * *